United States Patent [19]

Bird

[11] Patent Number: 4,924,233

[45] Date of Patent: May 8, 1990

[54] SENSOR INPUT/OUTPUT SYSTEM WITH CONTINUOUS COMPASS INTERFACE

[75] Inventor: Rebecca A. Bird, Earlysville, Va.

[73] Assignee: Sperry Marine Inc., Charlottesville, Va.

[21] Appl. No.: 241,166

[22] Filed: Sep. 2, 1988

[51] Int. Cl.⁵ .................. G01S 13/86; G01C 21/00
[52] U.S. Cl. .................................... 342/175; 342/41; 364/443
[58] Field of Search .................. 342/41; 364/424.03, 364/443, 453, 456, 457

[56] References Cited

U.S. PATENT DOCUMENTS

| | | | |
|---|---|---|---|
| 3,786,505 | 1/1974 | Rennie | 342/33 |
| 3,981,008 | 9/1976 | Mann | 342/41 |
| 4,340,936 | 7/1982 | Mounce | 364/443 |
| 4,428,053 | 1/1984 | Tol | 364/457 X |
| 4,513,378 | 4/1985 | Antkowiak | 342/389 X |

Primary Examiner—Thomas H. Tarcza
Assistant Examiner—Gilberto Barrón, Jr.
Attorney, Agent, or Firm—Seymour Levine

[57] ABSTRACT

A sensor input/output system in a main radar system maintains continuous power to the compass interface when the main radar system is shut down. A single level of interrupt handlers is utilized without interrupt nesting or control by task executive software. The sensor input/output system is functionally partitioned such that all of the service required by an interrupt is continuously provided until the service is completed. A digital processor for providing the interrupt servicing and control and PROM firmware for storing the interrupt handlers also have backup power continuously applied. Since the processor compass interrupt handler and compass interface are continuously powered, heading synchronization is maintained by the main radar system during power down conditions.

6 Claims, 1 Drawing Sheet

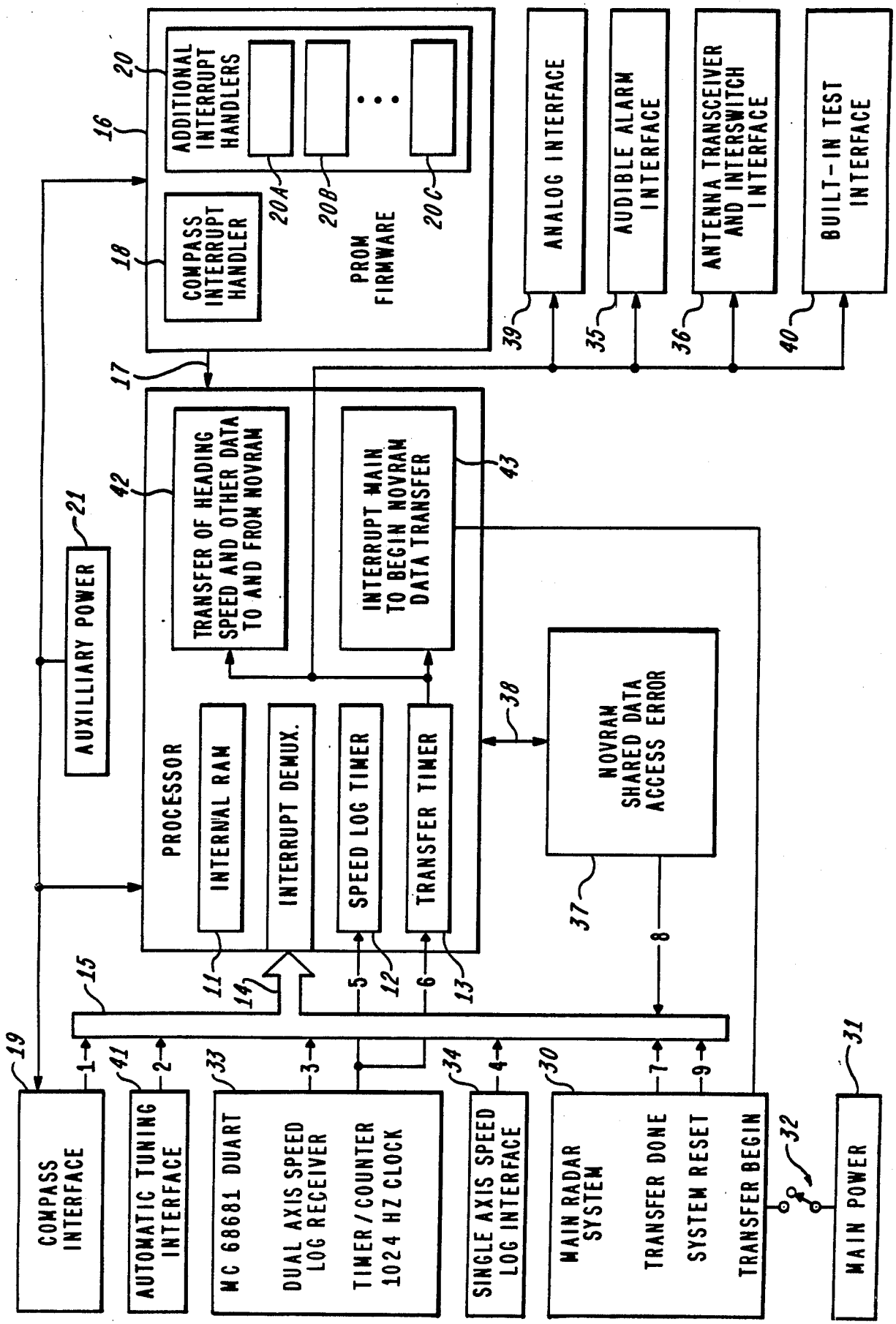

SENSOR INPUT/OUTPUT SYSTEM WITH CONTINUOUS COMPASS INTERFACE

BACKGROUND OF THE INVENTION

1. Field of the Invention

The invention relates to marine vessel bridge systems, particularly with respect to interfacing sensors thereto.

2. Description of the Prior Art

Integrated bridge systems for marine vessels are prevalent in the art which interface a plurality of sensors to a main system. For example, such systems are known that transfer data between a Main Radar System and sensors. Such sensors include gyrocompasses, speed logs, RS 232 sensor networks, analog and alarm hardware, radar transceiver and inter switch controls. The main system inputs and computes data pursuant to system operation. The compass interface in such present day bridge systems requires the operator to synchronize system heading with the gyrocompass or heading repeaters every time the system is turned on. Generally such systems do not provide for continuous compass interface during power-down. The synchronization process is time consuming, and may also be hazardous after a transient power failure with respect to collision avoidance radar.

Sensor interface software in most shipboard systems is designed to initialize all subsystems after hardware power-up, enable internal and sensor interrupts, provide a task executive to schedule and time-share periodic processing tasks, and provide interrupt handlers to perform minimal data collection and control. Major data processing is accomplished by the periodic tasks or background tasks, in which data protection schemes are required to prevent intervening computer interrupts from destroying data being processed. This multi-layered software system is complex, resulting in high design and maintenance costs. In order to provide continuous compass interface with such interrupt handler/task partitioned systems, it is required that the memory and timer components which run the executive and tasks must always be powered. Such systems cannot be easily downgraded to service a subset of sensors after main power has been removed.

SUMMARY OF THE INVENTION

The invention comprises a Sensor Input/Output System (SIO), which comprises and transfers data between a Main System, such as a Main Radar System (MAIN) and sensors. The SIO provides continuous interface to compass data without loss of synchronization, even while power is removed from the MAIN and all other interface hardware.

The invention comprises sensor interface apparatus for interfacing a compass system sensor and a plurality of additional sensors to the Main System. A compass interface for interfacing the compass system sensor to the Main System provides a compass interrupt when compass data are ready. A plurality of additional interfaces for interfacing the additional sensors to the Main System provide a plurality of respective additional interrupts when the respective interface data are ready. A digital processor is included having input ports for receiving the interrupts. A plurality of interrupt handlers service the respective interrupts without control by executive software. Each interrupt handler continuously services an interrupt to completion once the servicing required by the interrupt has begun. A main power source controllably provides power to the Main System and the additional interfaces. An auxiliary power source provides power to the compass system, the compass interface and the digital processor during power-down conditions.

Thus, the SIO of the present invention provides continuous compass interface during power-down by supplying backup power to only those components required for compass interface, and by a functionally partitioned, interrupt-based software design. The software structure is a single level of interrupt handlers, with no intervening interrupts, no background tasks, and no task executive. Interrupt handlers are provided to service external sensors and respond to internal timers and system events. Such SIO software is simpler to maintain than prior art designs, since all processing relative to a sensor or internal event resides in the same program partition. The present invention does not utilize the task/interrupt handler division of processing. The SIO system of the present invention effects the transition from providing all interface functions, to providing only compass interface, and back to full function, readily and without special exception processing. Thus, it is appreciated, that if the ship's gyrocompass is not turned off, the heading input will not require synchronization. The azimuth stabilizer maintains heading when the radar system power is turned off.

BRIEF DESCRIPTION OF THE DRAWING

The sole FIGURE is a functional schematic block diagram of the sensor input/output system of the present invention.

DESCRIPTION OF THE PREFERRED EMBODIMENT

Referring to the sole FIGURE, the functional design of the SIO of the present invention is illustrated. Central to the SIO is a digital processor 10 which performs all SIO functions. The processor 10 may be implemented by an INTEL 80C31 single chip microcomputer. The processor 10 contains an internal RAM 11 and two programmable timers 12 and 13. The timer 12 is utilized as a speed log timer and the timer 13 is utilized as a transfer timer in a manner to be described. The processor 10 includes I/O ports 14 which demultiplex external interrupts received from a bus 15. The processor 10 also has access to external I/O devices via digital/analog (DAC) and analog/digital (ADC) converters as well as via digital transceivers. The SIO includes PROM firmware 16 which communicates with the processor 10 via a data path 17. The PROM firmware 16 includes a compass interrupt handler 18 which provides service to the gyrocompass system via a compass interface 19. The compass interface 19 provides an INTERRUPT 1 to I/O port 14 of the processor 10 via the bus 15. The PROM firmware 16 further includes additional interrupt handlers 20 individually denoted as 20a, 20b and 20c. The interrupt handlers 20 service additional interrupts INTERRUPT 2 through INTERRUPT 9 illustrated in the FIGURE. An auxiliary power supply 21 is included which always supplies backup power to the processor 10, the external PROM 16 and the compass interface hardware 19. All other functions illustrated in the FIGURE are inactive during MAIN power-down. It is appreciated, therefore, that the processor 10 always has access to the PROM firmware 16 and the compass interface hardware 19.

When the SIO is operating on backup power, the processor 10 receives only one interrupt; viz, INTERRUPT 1.

The compass interface 19 hardware provides interrupts (INTERRUPT 1) at 50/60 or 400 Hz, depending on the compass reference frequency. The SIO processor 10 services INTERRUPT 1 by translating compass data into degrees of heading with 1/6th degree accuracy. Compass step data and 1-speed (360 deg/rev) synchro data are read directly. The 360-speed (1 deg/rev), 180-speed, (2 deg/rev), and 90-speed (4 deg/rev) synchro data are read in pseudo-step format. Pseudo compass data is described in copending U.S. patent application Ser. No. 97,975, filed Sept. 17, 1987 entitled "Pseudo Step Compass Processor" and assigned to the assignee of the present application. Updated heading is stored in internal RAM 11 of the processor 10. With no active compass interrupt, when the system is operating on backup power, the processor 10 enters a low power Idle Mode and halts.

The MAIN radar system in which the SIO of the present invention is utilized is denoted by reference numeral 30 and MAIN power is illustrated at 31. When MAIN power 31 is applied (schematically illustrated by a switch 32), the processor 10 receives eight additional interrupts, INTERRUPT 2 through INTERRUPT 9. All of the INTERRUPTS 1-9, except the timers (INTERRUPTS 5 and 6) are received as external interrupts via the bus 15. When MAIN power 31 is applied, all other sensor interfaces are powered except the compass interface 19 which is continuously energized. With application of MAIN power, the DACS and ADC (not shown) are energized. Also energized is a dual universal asynchronous receiver/transmitter 33 (DUART) including a serial speed log interface and timer/counter clock to be further described. The speed log provides INTERRUPT 3 and the timer/counter times the internal timers 12 and 13 of the processor 10. Also powered by MAIN is a 200 pulse/knot contact closure speed log interface 34 that provides INTERRUPT 4. Further energized by application of MAIN power are audible alarm controls 35, antenna transceiver and interswitch interfaces 36 and a nonvolatile RAM 37 (NOVRAM) for exchange of sensor data. NOVRAM 37 communicates with the processor 10 via I/O ports 38. Also powered by MAIN is an analog interface 39 for interfacing to analog subsystems. The analog interface 39 includes DACS for converting digital data from the processor 10 into the analog format required in the analog subsystems, and an ADC for receiving analog data into the processor in digital form. A built-in test (BITE) interface 40 is also powered when MAIN is turned on. The SIO also includes an automatic tuning interface 41, which receives power when MAIN is turned on. The interface 41 provides INTERRUPT 2 to the bus 15.

Thus, it is appreciated, that the processor 10 can only access shared data in the NOVRAM 37 and the non-compass interface hardware during operation of the MAIN. The arrows numbered 1-9 indicate the respective INTERRUPT 1 through INTERRUPT 9 to the processor 10 to be explained in detail hereinafter. The functions 35, 36, 39 and 40 are serviced periodically when triggered by the Transfer Timer 13 or the Transfer Done INTERRUPT 7 from the MAIN radar processor 30 in accordance with system design. Also serviced periodically when triggered by the Transfer Timer 13 is a function 42 controlling transfer of heading, speed, and other data to and from NOVRAM 37 in a manner to be described. A function 43 is also serviced periodically when triggered by the Transfer Timer 13 for interrupting MAIN 30 to begins its NOVRAM data transfer. The non-compass interrupt sources and the corresponding SIO responses are as follows:

INTERRUPT NO. 2

The automatic tuning circuitry of the radar system provides INTERRUPT 2 whenever tune meter data is ready for processing. The SIO reads the tune meter reading via ADC, computes a new improved tune value, and outputs this value to the radar tune circuit via DAC.

The DUART 33 includes both serial data receiver and timer/counter clock components. The receiver component interrupts the SIO processor 10 whenever data is ready from a dual axis speed log (INTERRUPT 3). The clock component is programmed to drive the Speed Log Timer 12 and Transfer Timer 13 at 1024 Hz. When these timers overflow, the SIO processor 10 is interrupted internally (INTERRUPT 5 and INTERRUPT 6).

INTERRUPT NO. 3

The DUART 33 receiver provides interrupts from a dual axis speed log which transmits speed data as RS232 messages. The SIO processor 10 extracts fore/aft and port/starboard speeds from the log messages and stores the speed values in internal RAM 11.

INTERRUPT NO. 4

The single axis speed log interface 34 provides interrupts from a 200 pulse/knot speed log. The SIO processor 10 uses the Speed Log Timer 12 to measure the interval between pulses and computes a sample speed for storage in the internal RAM 11.

INTERRUPT NO. 5

The Speed Log Timer 12 interrupts the processor 10 if no speed log pulses from the interface 34 are received for 64 seconds. The processor 10 determines whether the lack of pulses is caused by zero ship speed or an open log cable and reports the result to MAIN.

INTERRUPT NO. 6

The Transfer Timer 13 internally interrupts the processor 10 regularly at 64 Hz. The processor 10 responds by transferring current heading, filtered speed, tuning data, antenna transceiver status, interswitch status, and built-in test results to the MAIN system 30. This data transfer occurs by copying values from the internal RAM 11 and I/O ports of the processor 10 of interfaces 36, 39, and 40 (all represented schematically at 38) into shared locations in NOVRAM 37. The MAIN processor 30 is then interrupted by the function 43 to receive the values.

INTERRUPT NO. 7

After the MAIN processor 30 has read the sensor data in NOVRAM 37 and sent updated control data to the processor 10, MAIN 30 signals "Transfer Done". The SIO processor 10 then processes any heading synchronization, analog sensitivity time control, gain and alarm volume controls, audible alarm patterns, antenna transceiver controls, interswitch controls, and new installation data in the NOVRAM 37, such as compass types, speed log types, serial message types and antenna transceiver types.

INTERRUPT NO. 8

If any access collisions occur in the shared NOV-RAM 37, due to arbitration failure, a bus error interrupt is generated. The SIO processor 10 reports the failure to the MAIN processor 30 on the next transfer.

INTERRUPT NO. 9

The processor 10 receives a System Reset interrupt whenever the MAIN 30 is turned on. The SIO processor 10 responds by initializing all of the previously described interfaces (except the compass interface 19, which is continuous), and enabling all interrupts.

When power is removed from the non-compass interfaces by turning off the MAIN system power 31, all associated software functions are completed and are not restarted until MAIN power 31 is restored. This process is performed without burdening the program with power detection code. Since all functions are interrupt-based, the processing stops after the interrupts discontinue. Only INTERRUPT 1 from the compass interface 19 continues in backup power mode. Since the SIO processor 10 computes and stores synchronous heading data on the occurrence of every INTERRUPT 1, continuous compass synchronization is maintained. When MAIN power 31 is restored, the compass heading is again transferred at 64 Hz to the MAIN radar system 30 for display and target tracking.

It is appreciated from the foregoing that the SIO software is designed for continuous compass processing with no background processing and no task executive. All processing is interrupt-based and compactly coded to avoid delays in service of sensor signals. Interrupt handlers are single level, such that no service routine is interrupted by another interrupt handler. When the interrupts are not active, the processor 10 returns to low power Idle Mode. Efficiencies are obtained by completing sensor processing within the interrupt handlers and eliminating interrupt nesting, background tasks, and a multi-tasking executive. As a result, the processor 10 operates 85% of the time in Idle Mode. This low processor loading permits the SIO to provide fast responses to sensor events. For example, close following of compass changes is particularly important to the radar tracking system. The compass processing is partitioned to permit accurate and continuous compass interface without power from the MAIN radar system 30.

It is appreciated from the foregoing that the single level, interrupt based architecture of the present invention results in a minimum amount of backup powered components in order to maintain continuous compass interface. Although the present invention was described in terms of a radar system, the SIO software design described herein may be useful for other marine vessel bridge systems which primarily perform sensor interface functions, particularly if continuous heading synchronism is required.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Sensor interface apparatus for interfacing a compass system sensor and a plurality of additional sensors to a main system comprising:
    a compass interface for interfacing said compass system sensor to said main system, said compass interface providing a compass interrupt when compass data are available,
    a plurality of additional interfaces for interfacing said additional sensors, respectively, to said main system, said plurality of additional interfaces providing a plurality of additional interrupts, respectively, when respective interface data are available,
    digital processor means having input port means for receiving said interrupts,
    a plurality of interrupt handlers responsive, respectively, to said interrupts for servicing said interrupts, respectively, without control by executive software, each said interrupt hanler continuously servicing an interrupt to completion once said servicing has begun and being constructed and arranged to provide all the servicing required by said interrupt,
    a main power source for controllably providing power to said main system, and
    an auxiliary power source for providing power only to said compass system sensor, said compass interface, at least said interrupt handler servicing said compass interrupt and said digital processor means when said main power source is not providing power to said main system,
    thereby providing a continuous compass interface for maintaining heading synchronization while said main power source is not providing power to said main system.

2. The apparatus of claim 1 further including means for providing power to said additional interfaces when said main power source provides power to said main system.

3. The apparatus of claim 1 wherein said interrupt handlers reside in read-only memory in communicating relationship with said digital processor means.

4. The apparatus of claim 1 wherein said main system comprises a radar system.

5. The apparatus of claim 1 wherein said plurality of interrupt handlers are arranged in single level architecture.

6. The apparatus of claim 5 wherein said plurality of interrupt handlers are so constructed and arranged such that no interrupt service routine is interrupted by another interrupt handler.

* * * * *